Patented Sept. 4, 1923.

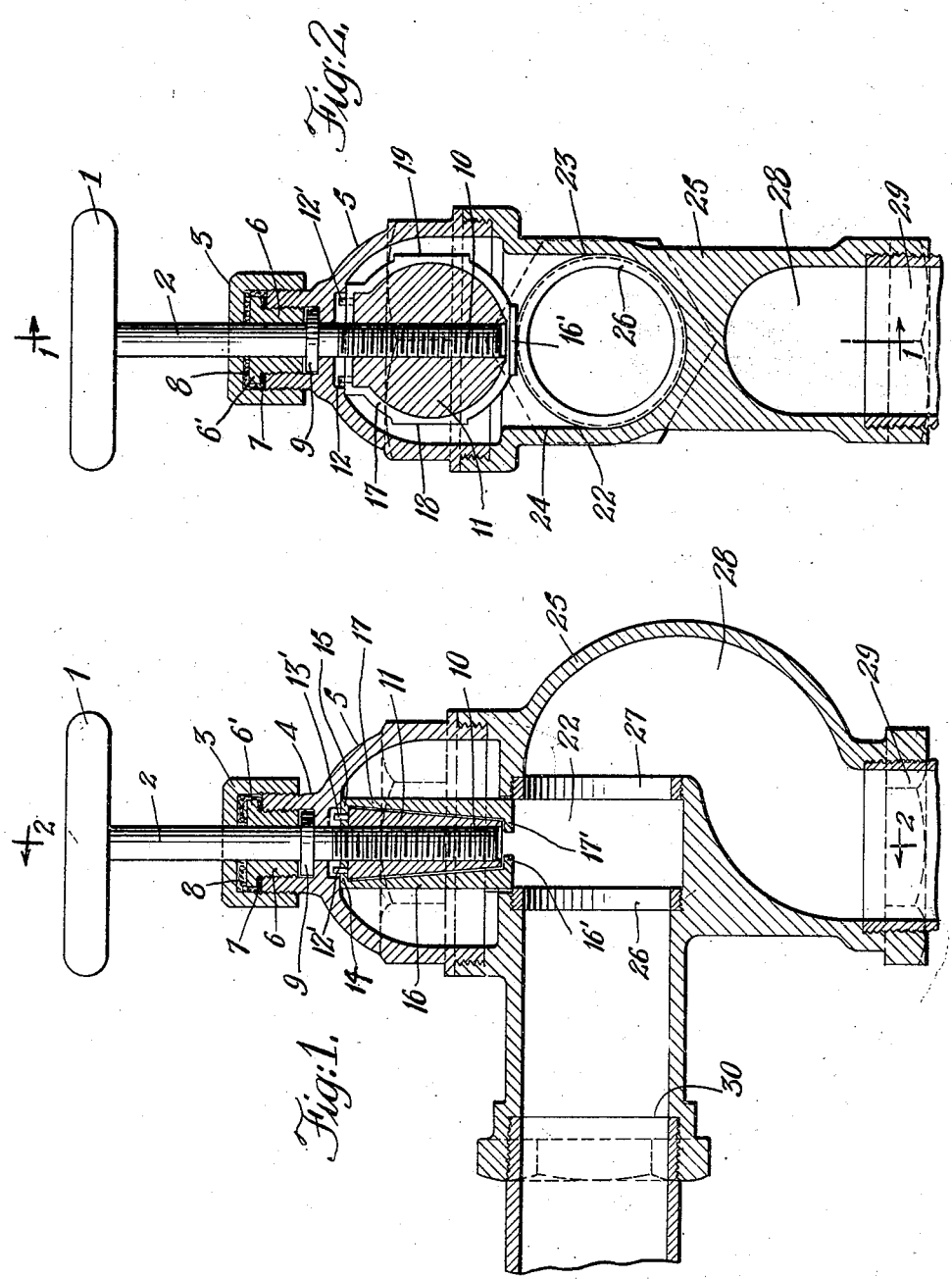

1,467,069

UNITED STATES PATENT OFFICE.

JACOB E. SCHEHR, OF NEW YORK, N. Y.

ANGLE GATE VALVE.

Application filed December 18, 1920. Serial No. 431,547.

*To all whom it may concern:*

Be it known that I, JACOB E. SCHEHR, a citizen of the United States, and resident of New York, in the county of New York and State of New York, have invented certain new and useful Improvements in Angle Gate Valves, of which the following is a specification.

This invention relates to angle valves.

It is frequently desirable to connect up an angle valve without regard to the direction of flow of the fluid through the valve for the reason that obstructions, such as a door, wall, etc., prevent the proper connection of the valve. In order that the connection of the valve might be reversed not only must the valve operate effectively regardless of the direction of flow but also the pipe connections of the valve must be equidistant from the center of the valve, otherwise new lengths of pipe would have to be cut and threaded in order to permit reversal of the valve. One of the objects of this invention is to provide a valve that can be connected up without regard to the direction of flow of the fluid through the valve.

Other objects of this invention are to provide a valve having no small parts to be mislaid when making repairs, or when wear occurs, to get loose or out of place and one that can be readily assembled without the double gate falling apart from the wedge.

Other objects will appear more fully hereinafter.

Referring to the accompanying drawings:

Figure 1 is a side view in vertical section of an angle valve embodying the principles of my invention.

Figure 2 is a view in vertical section along the line 2—2 of Figure 1.

1 is a manually operated handwheel suitably fastened to spindle 2. A cap 3, through which spindle 2 passes, is interiorly threaded to screw down upon the threaded portion 4 of bonnet 5. Bushing 6, is threaded into cap 3. Flange 6' thereof overlaps the threaded portion 4 of bonnet 5. Washer 7 prevents leakage past bushing 6 from bonnet 5. Packing 8 within cap 3 above bushing 6, prevents leakage past spindle 2. Packing 8 may be readily renewed without breaking down the valve other than a removal of cap 3.

Spindle 2 is of the inside screw type, threaded at its lower end, and has a collar 9 integral therewith to rotate between bushing 6 and bonnet 4 within stuffing box 3, to prevent longitudinal motion of spindle 2 when the latter is operated to open or close the gate.

The threaded end 10 of spindle 2 has an interiorly left hand threaded wedge 11 therefor. Pins 12, 12' 13, 13' upon the top of wedge 11, cooperate with holes in flanges 14 and 15 of gates 16 and 17. The lower ends of gates 16 and 17 have flanges 16' and 17' that overlap the bottom of wedge 11. Shoulders 18, 19, on gate 17 operate in channel seats 22, 23 of internal wall 24 of casing 25, and likewise the shoulders of gate 16 operate in channels 22, 23. These channels hold the shoulders and prevent the gates in connection with the pins and cooperating flanges of the gates and the bottom flanges from becoming separated from the wedge 11. Such a construction permits of utilization of the valve upside down. Brass rings 26, 27 form gate seats for gates 16 and 17. Casing 25 has fluid passage 28 of uniform diameter terminating in openings 29 and 30, interiorly threaded to receive the threaded ends of pipes 31, 32. Exterior of casing 25 at openings 29, 30, is hexagonal to permit of assembly of the pipes and valve. Likewise the exterior base of bonnet 5 is hexagonal to permit of removal of the bonnet.

The operation of the valve is as follows:

Handwheel 1 is manually operated to rotate spindle 2 from left to right, to close gates 16, 17 through the action of the screw end of spindle 2 upon the interiorly threaded wedge 11 which carry the gates 16, 17 pinned thereto. Upon the closing of the gates 16, 17 the wedge 11 bears against the gates to seat them tightly and thereby effectively cut off the passage of fluid.

In case of a repair the bonnet or stuffing box may be readily removed. Upon a reassembly of the valve the gates 16, 17 are hung upon the pins, 12, 12', 13, 13' which prevents the dislocation of the gates.

It will be seen that I have provided a very simple angle gate valve of few parts, free from leakage, easily and quickly assembled, which can be used without respect to the direction of flow of fluid therethrough without obstructions and one that will be effective in shutting off the flow of fluid.

What I claim is:—

1. A reversible angle valve comprising a fluid pressure passage through said casing of uniform diameter, inlet and outlet ports equidistant from the center of the valve, a threaded spindle, an interiorly threaded wedge cooperating with said spindle, gates hung on said wedge, said gates having flanges at their bases to overlap the base of said wedge, channels in said casing, flanges on the sides of said gates operating in said channels and ring seats for said gates.

2. A reversible angle valve comprising a fluid pressure passage through said casing, inlet and outlet ports equidistant from the center of the valve, a threaded spindle, an interiorly threaded wedge cooperating with said spindle, pins on the top of said wedge, gates having flanges on the bottom thereof to overlap the base of said wedge, said gates having oversize holes for said pins, channels in said casing, flanges on the sides of said gates operating in said channels and seats for said gates.

3. In an angle valve, a casing, a bonnet threaded to said casing, a threaded spindle operating within said casing and bonnet, a wedge interiorly threaded for said spindle, gates pinned to said wedge, flanges on said gates overlapping said wedge, ring seats for said gates, a stuffing box threaded to said bonnet and a flanged bushing therein for said spindle.

4. In a reversible angle valve, a casing, a fluid pressure passage through said casing, pipe threaded outlet and inlet openings for said fluid pressure passage equidistant from the center of the valve, a threaded spindle, a wedge interiorly threaded for said spindle, removable gates hung on said wedge, means to prevent the separation of the gates and wedge when the valve is reversed, a bonnet threaded to said casing, a cap threaded to said bonnet, a flanged bushing therein for said spindle, packing between said bushing and cap and a washer between said bushing and bonnet.

5. In a reversible angle valve, a bonnet, a casing, a fluid pressure passage, pipe threaded outlet and inlet openings for said pressure passage equidistant from the center of the valve, a threaded spindle, a wedge interiorly threaded for said spindle, gates for said wedge, ring seats for said gates and means for loosely securing said gates to the wedge and means to prevent separation of the gates and wedge to permit of operation of the valve upside down.

Signed at New York, in the county of New York and State of New York, this 14 day of December, A. D. 1920.

JACOB E. SCHEHR.